Figure 1:
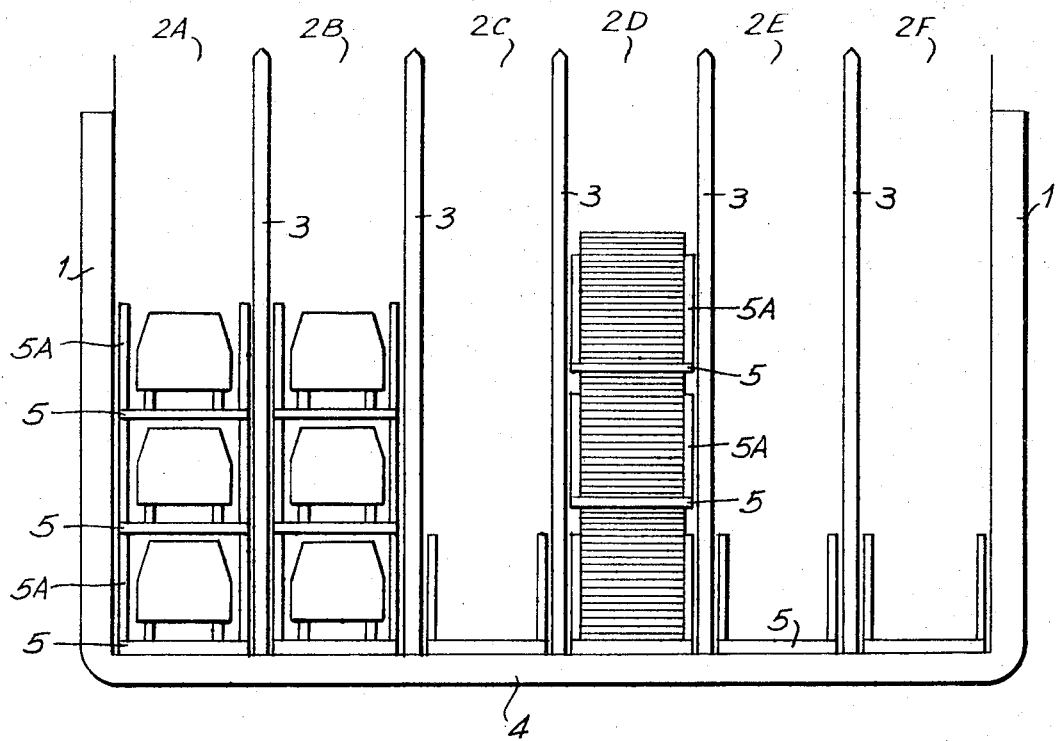

United States Patent [19]
Peterson

[11] 3,836,026
[45] Sept. 17, 1974

[54] METHOD OF TRANSPORTING SHIP CARGO

[75] Inventor: Per-Erik Arnold Peterson, Taby, Sweden

[73] Assignee: Rederiaktiebolaget Nordstjernan, Stockholm, Sweden

[22] Filed: Feb. 9, 1973

[21] Appl. No.: 331,250

Related U.S. Application Data
[63] Continuation of Ser. No. 105,892, Jan. 12, 1971, abandoned.

[30] Foreign Application Priority Data
Jan. 13, 1970 Sweden............................. 372/70

[52] U.S. Cl................ 214/152, 108/53, 214/10.5 R
[51] Int. Cl........................................... B65d 19/22
[58] Field of Search........ 214/10.5 R, 12, 14, 15 R, 214/38.20, 38.42, 152; 108/51, 53, 55

[56] References Cited
UNITED STATES PATENTS
| | | | |
|---|---|---|---|
| 2,851,188 | 9/1958 | Pavelle | 214/10.5 R X |
| 3,386,600 | 6/1968 | Betjamann | 214/15 R |

*Primary Examiner*—Frank E. Werner
*Attorney, Agent, or Firm*—Waters, Roditi, Schwartz & Nissen

[57] ABSTRACT

A method and system of transporting goods in alternative transport in vertically stacked relationship, in which the goods are positioned on platforms having upright support posts, superimposed platforms being supported on said posts when supporting light, damageable voluminous goods, and adapted to be alternatively filled with heavy, non-compressible and non-damageable bulk goods extending above the support posts of superimposed platforms whereby the load of the entire goods is transmitted through the cargo.

1 Claim, 3 Drawing Figures

METHOD OF TRANSPORTING SHIP CARGO

This application is a continuation application of Ser. No. 105,892, filed Jan. 12, 1971, now abandoned.

The present invention relates to a method of transporting goods, and, in particular, a method of loading cargo ships for alternative transport of general or piece goods, such as automobiles, and substantially non-compressible bulk goods, such as wood, particle board, and the like, with ships specifically constructed for the purpose, as well as a device for executing the method.

It is an old and very important problem of the shipowners of most countries to achieve a desirable cargo for outward as well as for backward sailing. Very often the ship transport from one harbour to another on a particular trade is arranged for transporting a specific kind of goods, coffee, ore, for instance, or a voluminous goods, motor cars for instance. Return cargo is a secondary problem, and due to the fact that very often the construction and equipment of the ship which is required for the main freight does not allow for taking goods of the delivery harbour on the return voyage. For this reason it has been a trend to construct and to equip the ships in such a manner that thay can, in a practicable manner, be used for transporting a specific kind of goods in one direction and of another, likewise specific kind of goods in the other direction.

This invention relates specifically to find a solution which makes possible a convenient transport of voluminous goods, automobiles in particular, in one direction, and heavy, robust goods, wood board, particle board and the like, in the other direction, the constructional equipment being such that loading and unloading of cargos with so widely differing features is provided for in a similarly expedient way. For this purpuse, the invention relates to a further development of the principle of container cargo, carried in vertical cargo shafts or cells throughout the ship, said shafts serving as kind of vertical silos for holding heavy and robust cargo, while the expedient loading and unloading properties combined with the container technique is maintained.

It belongs to prior art to transport piece goods as well as bulk goods carried in containers, which are either carried by a number of horizontal, stationary decks or by other vertical supports, or by hoistable decks carried by wires in vertical shafts. In all these cases, the load of the cargo contained in a container is transferred via containers to lower containers or decks.

In all such constructions a number of disadvantages are present. To transfer the load of a cargo from a plurality of superimposed containers to a deck, the containers have to be constructed accordingly to take very large vertical load, which leads to heavy and expensive constructional features of each container.

This invention relates to a solution to the problems mentioned above, obtained by the method of transporting in one direction of heavy, substantially non-compressible and non-damageable goods and in the opposite direction of light, damageable and voluminous goods with ships comprising a plurality of vertical cargo shafts and by aid of cargo platforms which are translatorily displaceable vertically in said shafts and comprise vertical support posts, which is characterized by the fact that in one of said alternatives platforms loaded with heavy, substantially non-compressible and non-damageable goods are stacked in the shafts above each other in such manner that a platform located above a lower platform is carried by the goods loaded on the lower platform and that in the second of said alternatives platforms loaded with light, damageable and voluminous goods are arranged in the shaft in such a manner that the load of a lower platform is not exposed to forces originating from an upper platform.

When loading a ship in accordance with the invention, the load is transferred to the carrying construction of the ship in one manner when transporting piece goods and in a different manner when transporting bulk goods.

To make possible transport in accordance with the invention, the invention relates as well to a system for transporting with a ship of heavy bulk goods in one direction and voluminous piece goods in the other, the ship comprising a number of vertical cargo shafts for stowing cargo-carrying platform units stacked above each other, in which each platform unit comprises vertically extending support members, posts for instance, by means of which platforms arranged above each other in a cargo shaft are retainable in the shaft at a predetermined mutual distance vertically between cargo carrying surfaces of the respective platform units, said platform units being open upwardly so as to be loadable with bulk load to a height exceeding said support members of each platform unit being dimensioned to carry the total load of the voluminous goods for which the ship is designed to be used for transport in one direction and contained in a fully loaded shaft of the vessel, while the strength of said support members against vertical load is insufficient for carrying the full quantity of bulk goods for which the ship is designed to be used for transport in the other direction and that could be stowed in a fully loaded shaft.

Thus, when using the invention, the cargo is deposited on hoistable platform units which are so constructed that, when the ship is carrying piece goods, automobiles for instance, the load is transferred from a platform via carrying constructional members to an adjacent lower platform unit, while, when the ship is carrying a substantially non-compressible bulk cargo, such as wallboard or the like, the load of a platform unit is transferred immediately to the goods of the lower platform unit.

The platform units as such are therefore exposed to a load only when transporting light, voluminous goods, and when hoisting or lowering of loaded platform units.

Consequently, the platform units serve, during the transport of heavy bulk goods, nearly as kind of webbing between portions of the load, holding the goods in place within the shaft.

Figure 2:
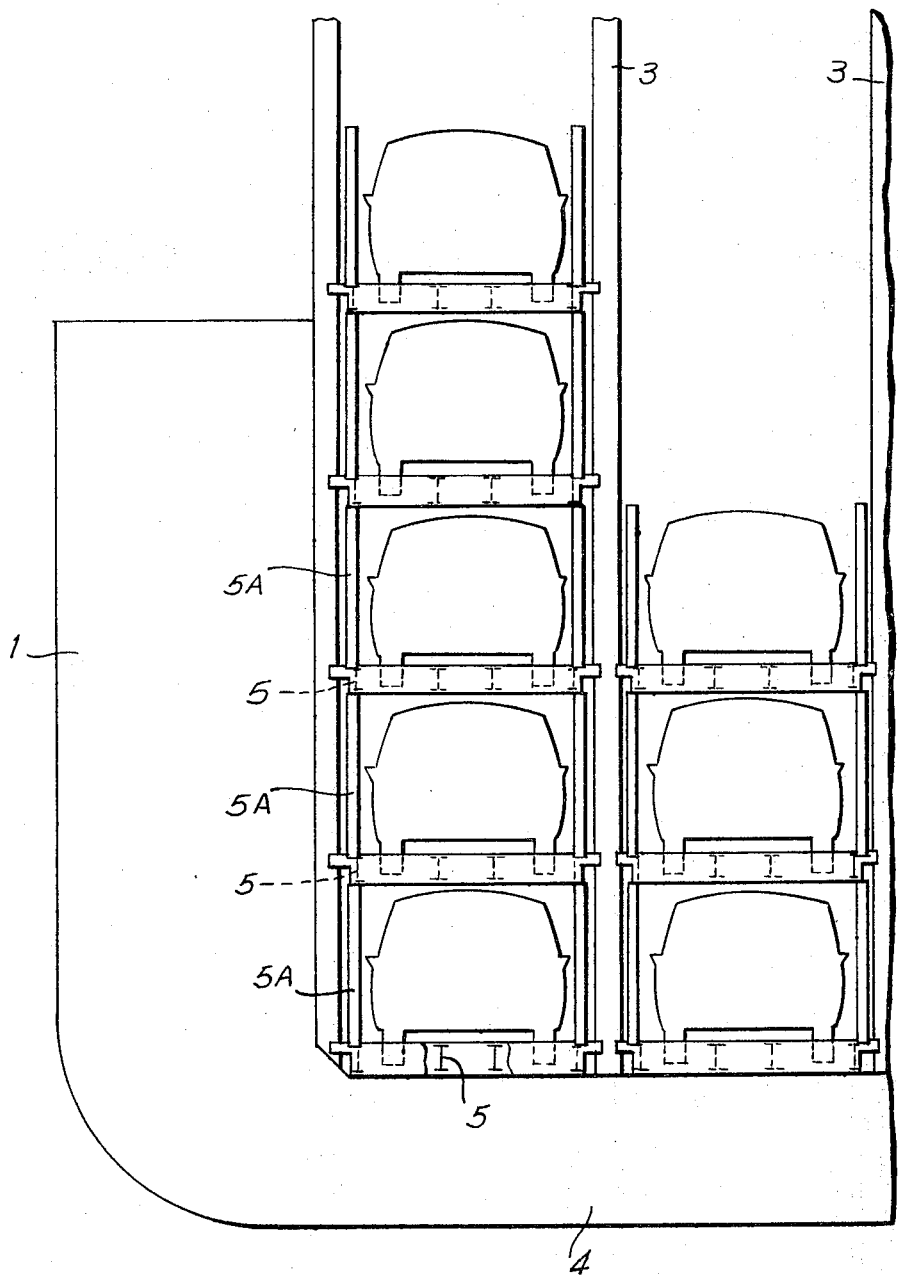
Figure 3:
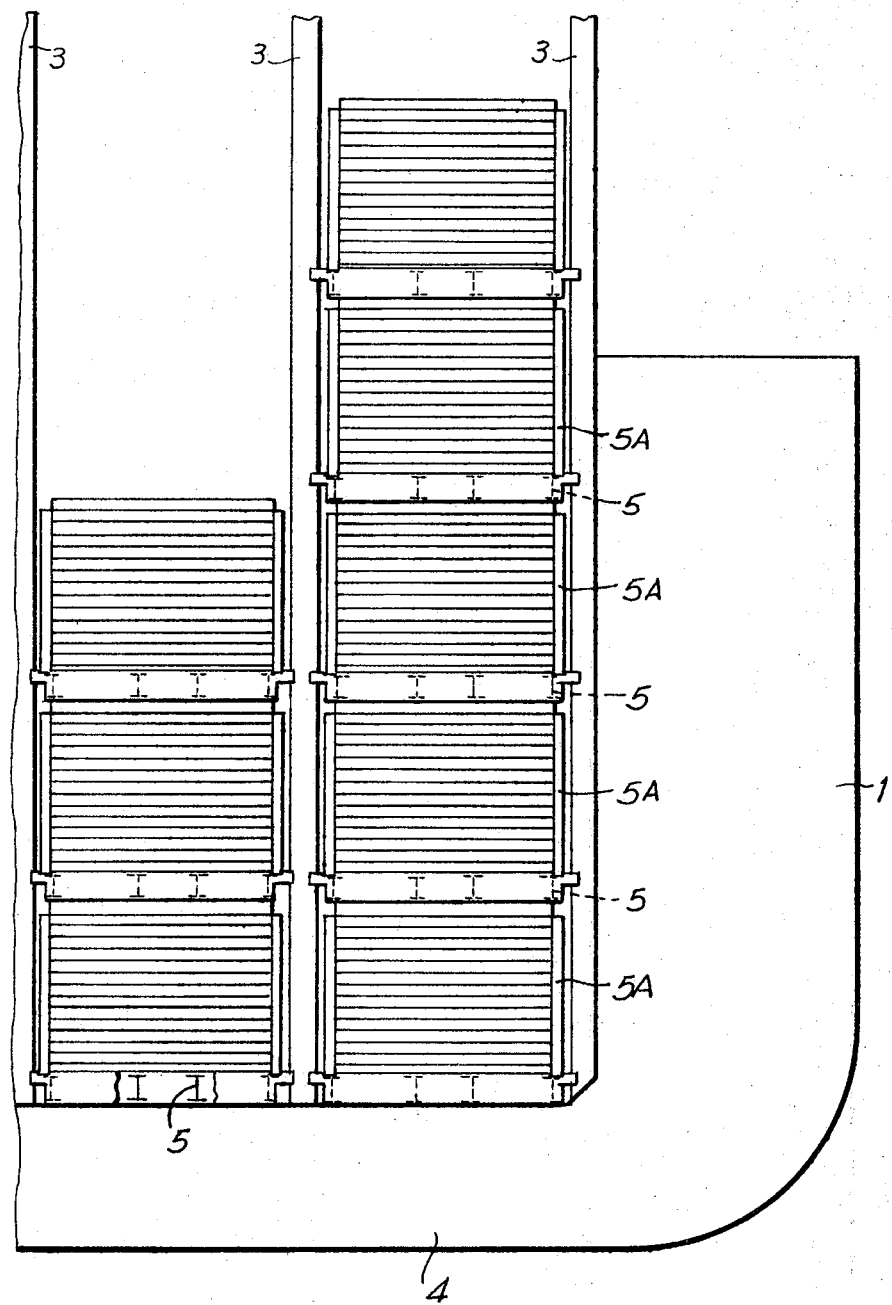

With the foregoing object in view, the invention will be more fully described hereinafter in conjunction with the accompanying drawing wherein:

FIG. 1 is a vertical sectional view of the hull of a cargo ship having a plurality of vertical cargo shafts and platform units and goods carried thereby, FIG. 2 showing the arrangement of platform units when loaded with automobiles, and FIG. 3 the platform units when loaded with noncompressible bulk goods.

Between the sidewalls 1 of the ship's hull, vertical cargo shafts 2A – 2F extend between vertical stays 3, as shown extending down to the double bottom 4 of the ship. Said stays 3 may be columns, bulkheads, or constructional members of other kind, defining vertical cargo shafts of a horizontal section suitable for the purpose. The limitation laterally of the shaft is of no substantial importance in connection with the invention, if only a plurality of shaft-defining stays are present which are mutually stiffened by structural elements longitudinally and laterally to carry force components in the horizontal direction.

Loading of voluminous piece goods is illustrated by the cargo arranged in shaft 2B in FIG. 1 and by FIG. 2, showing the cargo as being automobiles, the weight of platform units 5 and goods carried by each platform, automobiles 6, being transferred vertically from platform unit to platform unit down to the double bottom of the ship via vertical support members 5A of the respective platforms. Said vertical support members are thus so high that the voluminous piece goods to be loaded on each individual platform unit is accomodated between two platform surfaces of two vertically adjacent platform units when resting on each other by the intermediary of the support members 5A. As shown, the support members 5A are arranged so as to extend upwardly from the surface of pertaining platform to the required heights, but obviously they may be arranged in other manner so as to give a desired space vertically.

Loading of heavy bulk load, such as wood fibre board, is illustrated in shaft 2D of FIG. 1 and by FIG. 3. As shown, the platform unit is loaded so that the non-compressible bulk goods 8 extends farther upwardly than the support members 5A, wherefore a platform located above a lower one is carried by the goods resting on the lower platform unit, the weight of the cargo thus being successively transferred to the cargo of a lower platform unit and finally to the double bottom of the ship.

An advantage obtained by arranging according to the invention voluminous goods on platform units constructed so that the vertical forces of the cargo is carried by the platform units by action of the vertical supports thereof, and bulk cargo, which in itself is apt to carry heavy load, by the cargo itself, is that the structural members of the ship defining the shaft and which substantially constitute vertical guides for the platform units and intermediary stays, can be dimensioned substantially with due consideration to such lateral forces of the cargo which may arrive during transport and with respect to general strength requirements for the ship, while these constructional members need not be constructed so as to withstand the vertical forces originating from the weight of the cargo.

However, while maintaining important advantages obtained by the method according to the invention to load a ship, it is as well possible to provide the shaft walls and the platform units with such coupling means that the platforms, when loading piece goods, are accurable in selected positions within the shafts so as to be carried by the constructional members defining the shaft, while, when loading heavy bulk cargo, the goods carries the forces originating from the weight thereof, held laterally by the walls of the shaft.

While this invention has been described with respect to specific examples thereof, it should not be construed as being limited thereto. Various modifications and substitutions will be obvious to everyone skilled in the art and can be made without departing from the scope of this invention.

What is claimed is:

1. A method of loading a ship in alternative selective modes, comprising placing cargo of predetermined types of goods on a plurality of individual cargo-carrying platform units; and loading the units with the cargo located thereupon onto the ship so as to load the ship with a plurality of columns of stacked cargo each said column of units supporting a cargo of a first type of goods, each said column being formed of individual superimposed of said platform units with each said unit in said column except the lowermost being supported by the cargo on the unit located immediately therebelow, each said platform unit comprising a cargo-carrying surface having support members extending upwardly from the cargo-carrying surface and between which said cargo is located, said ship adapted to be loaded in an alternative mode by loading each platform unit with a cargo of a second type of goods limited in height to below the tops of said support members on each said platform unit, and loading the ship with said loaded units to form a plurality of columns of said platform units, each platform unit in a respective one of said columns except the lowermost thereof being supported by the support members of the platform unit located immediately below and being spaced above the goods on said lower platform, said first type of goods being constituted of heavy, substantially incompressible and non-damageable bulk goods and said second type of goods being generally light-weight, damageable and voluminous goods, said support members being adequate to only support the weight of the cargo formed by the second type of goods in each respective column of stacked cargo.

* * * * *